(12) United States Patent
Olsson et al.

(10) Patent No.: US 7,394,046 B2
(45) Date of Patent: Jul. 1, 2008

(54) TRACKING OF A MOVING OBJECT

(75) Inventors: Hakan Olsson, Mansarp (SE); Jan Wallenberg, Linkoping (SE); Leif Axelsson, Linkoping (SE)

(73) Assignee: SAAB AB, Linköping (SE)

( * ) Notice: Subject to any disclaimer, the term of this patent is extended or adjusted under 35 U.S.C. 154(b) by 322 days.

(21) Appl. No.: 10/908,644

(22) Filed: May 20, 2005

(65) Prior Publication Data
US 2008/0128546 A1 Jun. 5, 2008

(30) Foreign Application Priority Data
May 28, 2004 (EP) .................... 04445063

(51) Int. Cl.
*F41G 7/00* (2006.01)
*F41G 9/00* (2006.01)
*F42B 15/01* (2006.01)
*F42B 15/00* (2006.01)

(52) U.S. Cl. .................. 244/3.1; 244/3.15; 342/61; 342/62; 342/63; 342/175; 342/195; 701/1; 701/3; 701/200

(58) Field of Classification Search ........... 244/3.1–3.3; 342/61–65, 89, 90, 175, 195, 73–81; 333/166; 89/1.11; 701/1, 3, 200
See application file for complete search history.

(56) References Cited

U.S. PATENT DOCUMENTS

| 4,111,382 | A | * | 9/1978 | Kissinger ............... 244/3.1 |
| 4,589,610 | A | * | 5/1986 | Schmidt ................ 244/3.19 |
| 5,051,751 | A | | 9/1991 | Gray |
| 5,282,013 | A | | 1/1994 | Gregoris |
| 5,308,022 | A | * | 5/1994 | Cronkhite et al. ......... 244/3.14 |
| 5,479,360 | A | | 12/1995 | Seif et al. |
| 5,662,291 | A | | 9/1997 | Sepp et al. |
| 5,762,290 | A | * | 6/1998 | Dupont ................. 244/3.15 |
| 6,082,666 | A | * | 7/2000 | Windhorst et al. ........ 244/3.15 |
| 6,244,536 | B1 | * | 6/2001 | Cloutier ................ 244/3.19 |
| 6,259,974 | B1 | * | 7/2001 | Bessacini et al. .......... 244/3.15 |
| 6,410,897 | B1 | | 6/2002 | O'Neill |

OTHER PUBLICATIONS

G. Welch et al., "An Introduction to the Kalman Filter"; SIGGRAPH 2001, course 8; Los Angeles, California; Aug. 12-17, 2001.*
P. Maybeck, "Stochastic models, estimation, and control," vol. 1; Academic Press; New York, 1979; chapter 1 (pp. 1-16).*
Allen; Blackman: "Implementation of an angle-only tracking filter" Proceedings of spie, vol. 1481, Apr. 1, 1991, pp. 292-303, XP009038225, Bellingham, WA, USA.

* cited by examiner

*Primary Examiner*—Bernarr E Gregory
(74) *Attorney, Agent, or Firm*—Venable LLP; Eric J. Franklin

(57) ABSTRACT

A system for determination of kinematics of a moving object comprising: a sensor producing angular data for the object at a number of observation times, a state initialization unit, receiving angular data from the sensor and on basis thereof determining a first kinematic state of the object, and a tracking filter having a prediction unit, arranged to determine a predicted kinematics state of the object on bases of a kinematic model of the object, wherein the kinematic model comprises a guidance law locked on a known position, and at least one previously determined kinematic state of the object, and a state updating unit, receiving angular data from the sensor and the predicted kinematic state of the object, and on basis thereof determining an updated kinematic state of the object.

30 Claims, 5 Drawing Sheets

TRACKING OF A MOVING OBJECT

FIELD OF THE INVENTION AND PRIOR ART

The present invention relates generally to the improvement of the determination of the kinematics of a moving object. More particularly the invention relates to a method for determination of kinematics of a moving object, and a system for determination of kinematics of a moving object. The invention also relates to a computer program and a computer readable medium.

In many applications, civilian as well as military, there is a desire to be able to estimate the state of a specific process. Typically, these processes are modeled as stochastic processes. The models are then used in conjunction with data from one or more sensors to estimate the state of the process. A general sub-class of these problems is the task of estimating the kinematics of a moving object. Typical applications are air traffic control at airports, and tracking of hostile objects and in numerous military, air, sea, and land applications. In such applications, the use of unprocessed sensor data for presentation of information to an operator in a HMI (Human Machine Interface) system, and for further processing, will normally not yield satisfactorily results due to noise artifacts.

To overcome those problems, the state is normally estimated through a so-called tracking filter. One benefit from using a tracking filter is that tracks from a filter appear far less shaky on displays, than "raw" sensor data. Further benefits are that the tracking filter can predict the object kinematics quite well when measurements are sparse in time, and that the estimation errors for the filter tracks are equal to or lower than those of the unprocessed sensor data.

A tracking filter is an algorithm normally implemented in software that uses data from a sensor to perform a state estimation. There are numerous kinds and varieties of tracking filters, but most of the more sophisticated ones share a few important features. One of these is the use of predictive stage, i.e. the filter output is supported by a prediction of the kinematics of the object. The predicted state is computed from the previously filtered state according to assumptions on object dynamics. The output from the filter, i.e. the new filtered state, is computed as a weighted summation of the new measurement and the predicted state. A widely used technique for state estimation is the so-called Kalman filter, named after its inventor.

One occasion when it is important to determine the kinematics of an object with high accuracy is when a hostile missile attacks an aircraft. A missile warning system of today is only able to provide a warning in one bearing, i.e. it is only able to inform the pilot about that a missile has been fired, and in which direction it has been fired. Further, the system may also indicate when the missile activates its target seeker, and if the target seeker is locked on own aircraft. Since the warning does not contain any information about the distance to the missile, the distance has to be estimated based on other available data, which leads to low accuracy in the estimation. If it would be possible to estimate the distance and closing velocity with high accuracy, great improvements would be made regarding the judgment of which maneuvers, which countermeasure to be taken and at which time the counter measure will be most effective.

When detecting missiles, passive sensors, for example IR-sensors, are preferable used, since they do not reveal own aircraft, due to the fact that they do not send out any energy. A problem with all passive sensors is that they only deliver data in bearing and elevation and cannot measure distance and closing velocity. However, an advantage with passive sensors is that they have a high angular accuracy. Since distance and closing velocity are not measurable, they are estimated in a filtering process as described before. This estimation is normally associated with large uncertainties.

The prediction of the next state is made based on received angular data from the passive sensor and a previously estimated state. Since one normally has no understanding of the next maneuver of the object, the acceleration of the object cannot be predicted. The next maneuver of the object is for example movement to the left or right, or if the object rises or sink. To predict the next state of the object a simple kinematic model of the object has to be used. For example it is assumed that the object does not make any maneuvers and thus continues to move in the same direction as before, i.e. it is assumed that the accelerations of the object is zero. Thereby, the next position is simply extrapolated from the previous state and the amount of time passed since it was last updated.

A system and a method for passive determination of the range and type of a moving object according to the prior art are disclosed in U.S. Pat. No. 5,282,013. The method comprises selecting an object type from a library of object types storing signatures of the object types, considering measured contrast radians. The range of the object is calculated considering the selected object type, the angular movement of the object and the range estimate for the object made during the last scan. A draw back with the system and method disclosed in this document is that range and closing velocity of the object is estimated with a bad accuracy, due to the fact that the estimation is based only on previous movements of the object, and no information exists about future maneuvers of the object.

OBJECTS AND SUMMARY OF THE INVENTION

The object of the present invention is to provide a solution for the determination of the kinematics of a moving object, which solution offers a substantial improvement in the accuracy of the estimated kinematics, and thereby in the tracking performance.

According to one aspect of the invention this object is achieved by the initially described method for determination of the kinematics of a moving object, wherein said kinematic model comprises a guidance law locked on a known position. The method according to the invention enhances the tracking filter performance through the use of a kinematic model comprising a guidance law in the predictive step of the filtering.

It is assumed that the object navigates according to a set of rules or principles denoted a guidance law. Thanks to the fact that the kinematics of the object is predicted based on an assumption of how the object navigates it is possible to predict the next maneuver of the missile with a high degree of certainty. It is also assumed that the guidance law is locked on a known position, or on an object whose position and velocity is known. This means that it is assumed that the object has an intention to navigate towards the known position. The known position is for example the position of a vehicle or a site, e.g. an aircraft, a boat, or a stationary control station. Those assumptions are essential in the sense that it is this knowledge that makes it possible to predict the motion of the object with much larger certainty, than if the assumption is that the acceleration of the object is zero. Consequently, the process noise for the lateral and vertical axes can be kept much lower than in the general case where there are no apriori knowledge at all on the object maneuvers. This lead to a dramatically lower rate of uncertainty increase for the non-observable states, for example range and closing velocity, during time update.

The method according to the invention achieves a dramatic increase in the performance and robustness of the kinematic estimations, and thus in the tracking performance, when passive sensors are used. The tracking performance is also improved when active sensors, for example radar, are used, through not at such a dramatic level as for passive sensors. This is due to the fact that active sensors delivers measurements for one or both of the non-observable states, the range and possible the closing velocity. A further benefit from using the invention with an active sensor is improved sensor management.

The method according to the invention makes it possible to determine the kinematics of an object, i.e. the position, velocity and acceleration of the object. Which part or parts of the kinematic to be determined depends on the application in question. For instance, in the above-mentioned application in which the object is a hostile missile, the kinematics of interest is the position and velocity of the missile.

To be able to estimate also the non-observable states, such as position and velocity, the angular data should comprise at least a horizontal bearing (the azimuth angle), but also the elevation angle can be used with great benefit.

According to an embodiment of the invention it is assumed that the object follows own ship, i.e. it is assumed that the guidance law is locked on own ship, and the method comprises receiving own navigation data, and determining said predicted kinematics state of the object based on own navigation data. Own ship is a vehicle or a site where the tracking filter and sensor are located. Own navigation data comprises own position, own velocity and own acceleration. This embodiment is for example advantageous if the object is a missile having the own ship as its target. It is then possible to predict the next maneuver of the missile with a high degree of certainty. Furthermore, the need of a precise determination of the kinematics of the object is extremely important when own ship is the target of the missile.

According to an embodiment of the invention the method comprises: storing more than one guidance law, assuming that the object uses one of said stored guidance laws, determining an assumed guidance law based on said stored guidance laws and said received angular data, and determining said subsequent predicted kinematics state of the object, based on said assumed guidance law. As there are more than one guidance law stored, the chances to find out which guidance law the object follows increases. Thus, the possibility to predict the next maneuver of the missile is further increased and accordingly the determination of the object kinematics is further improved.

According to an embodiment of the invention the method comprises: storing a plurality of object types and associating each object type with one of said stored guidance laws, determining the type of object based on said received angular data, and determining said assumed guidance law in dependence of the determined type of object. It is a well-known fact, in particular for missiles, that a certain type of object often follows a certain guidance law. It is normally known which guidance law a certain type of missile follows. Thus, if the type of object is determined it is possible to determine which guidance law the object follows. An advantage with this embodiment is that the required computational load is low. This embodiment is useful if the object type can be determined with a certain degree of reliability.

According to a further embodiment of the invention the method comprises: determining more than one predicted kinematics state of the object, each predicted state being determined based on one of said stored guidance laws, estimating an error component for the predicted kinematic states based on said received angular data, and determining said assumed guidance law based on said estimated error components. In this embodiment of the invention a plurality of parallel tracks are initialized for all of, or for a subset of the stored guidance laws. By estimating the error of the prediction for each track, it is possible to find out which of the stored guidance laws the object follows. This embodiment is advantageous when it is difficult, or impossible, to determine the type of the object with enough certainty.

According to an embodiment of the invention the error component determined is the error covariance matrix for the predicted kinematic state. To determine the weighted summation of the measured and predicted state in a Kalman filter, the error covariance matrix for the predicted kinematic state is calculated. Thus, if a Kalman filter is used, it is advantageous to base the determination of which guidance law on the error covariance matrix.

According to an embodiment of the invention the method further comprises: storing information about a plurality of object types and which guidance law a specific object type preferably uses, identifying the type of the object based on said stored information and said assumed guidance law. If it is difficult to determine the object type, i.e. to identify the object, the result from the above-mentioned determination of which guidance law the object follows, can be used for identifying the object. When it has been decided which guidance law the object follows it is possible to exclude at least some object types. This knowledge can be combined with identification features available in sensor data. Thus, the identification of the object is improved.

According to an embodiment of the invention the method comprises: determining whether the object uses an assumed guidance law locked on own ship with a certain degree of reliability, and if so producing an approach warning. It is advantageous to determine whether the object uses the assumed guidance law with a certain degree of reliability based on an estimated error component for the predicted kinematic. From an estimation of whether the assumption that the guidance law of the object is locked on own ship fits well with the measurements or not, it can be derived whether the object actually is homing on own ship or not. If the object actually is homing on own ship an approach warning is delivered.

According to an embodiment of the invention the method comprises: calculating the acceleration of the object based on said kinematic model, and determining the predicted kinematics state of the object based on the calculated acceleration. It is an advantage to calculate the acceleration of the object since it goes directly into the equations of the predictive stage of the tracking filter.

According to a further aspect of the invention, the object is achieved by a computer program directly loadable into the internal memory of the computer or a processor, comprising software code portions for performing the steps of the method according to the invention, when said program is run on a computer. The computer program product is provided either on a computer readable medium or through a network, such as the Internet.

According to another aspect of the invention, the object is achieved by a computer readable medium having a program recorded thereon, when the program is to make a computer perform the steps of the method according to the invention, and said program is run on the computer.

According to another aspect of the invention, the object is achieved by a system for determination of kinematics of a moving object comprising: a sensor producing angular data for the object at a number of observation times, a state initialization unit, receiving angular data from the sensor and on basis thereof determining a first kinematic state of the object, and a tracking filter having a prediction unit, arranged to determine a predicted kinematics state of the object on bases of a kinematic model of the object and at least one previously determined kinematic state of the object, and a state updating unit, receiving angular data from the sensor and the predicted kinematic state of the object, and on basis thereof determining an updated kinematic state of the object, which is wherein said kinematic model comprises a guidance law locked on a known position.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
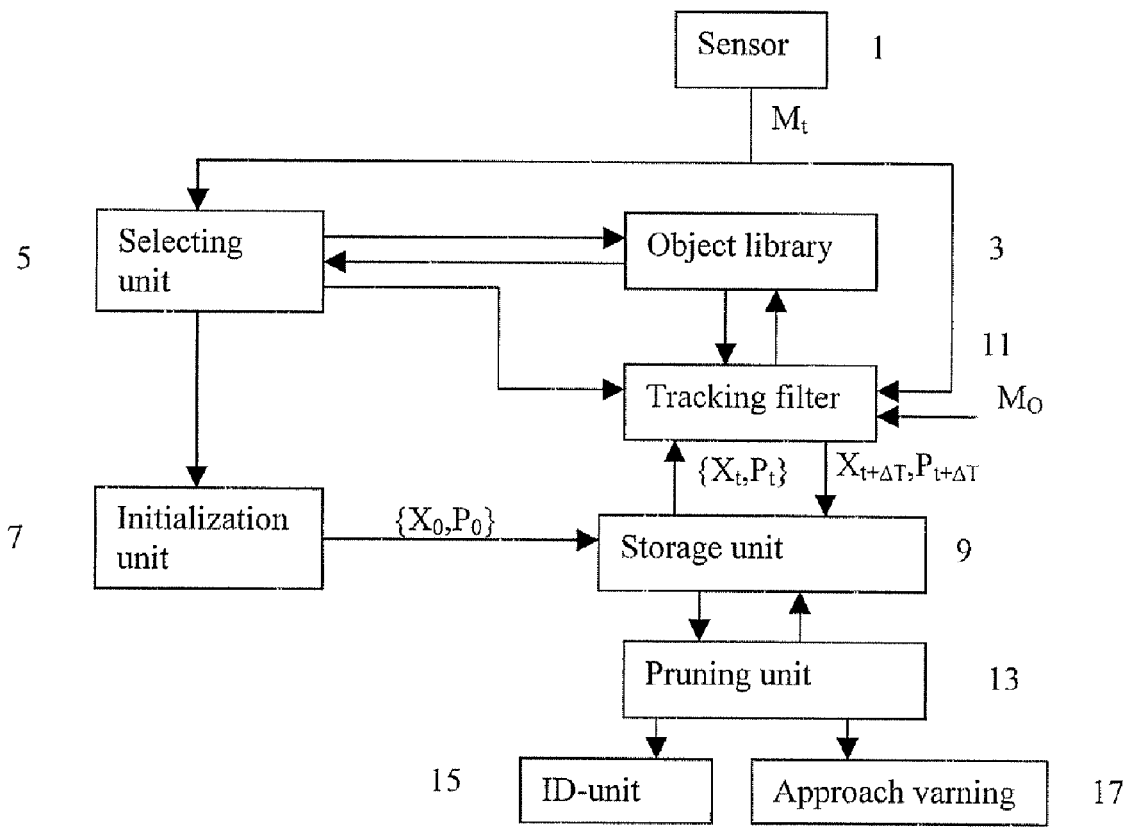
FIG. 1 shows a block diagram over a system for determination of kinematics of a moving object according to an embodiment of the invention.

FIG. 1 shows a block diagram over a system for determining kinematics of a moving object according to an embodiment of the invention. The system comprises at least one sensor 1 capable of producing angle measurements of a moving object. The sensor is preferably arranged on board own ship. Own ship is a vehicle or a site where the system is located. Data received from the sensor comprises at least the horizontal bearing, but it may also comprise the elevation angle. Measurements from additional sensors located on own ship, as well as from external sources, e.g. sensors on other aircraft, boats etc, whose measurements or tracks can be communicated to own ship can also be used to enhance tracking of the object.

The system comprises an object library 3 adapted for storing guidance laws and object parameters for a plurality of different object types. For each object type parameters such as weight, air resistance, drag resistance and which guidance law the object is assumed to use is stored. The library also contains a generic object type having a set of default parameters and a default guidance law, which are used when the type of the object is unknown.

The system further comprises a selecting unit 5 adapted to determine the type of the object based on angular data from the sensor 1. The selecting unit uses the object library to try to establish the type of object that the object belongs to. If enough identity features can be extracted from measurement the object type can be estimated. To improve the determination of the object type, it could also be based on measurements from a second sensor, or an external source. When any supporting sensor or sensors are used, these measurements can be used fully or partly. Only the identity features are used since the angle measurements of the sensor 1 are assumed to be of much better quality than those of the supporting sensor.

If the object type can be determined from the measurements from the sensor at a certain degree of reliability, object parameters and the assumed guidance law, is retrieved from the library 3. If the object type cannot be determined, generic values for the parameters, and the generic guidance law are retrieved from the library. Subsequent tracking filter updates are made using the determined guidance law and parameters, unless sensor measurement indicate that the initial assumption was erroneous and a shift to a more believable object type can be made.

Normally even active sensors do not provide enough information to assign one specific object type to a new track at a high enough degree of reliability. In an alternative embodiment, instead of directly assigning an object type to the track, a plurality of parallel tracks is initialized for all the object types in the library, or for suitable subsets of them. A plurality of possible object types is determined based on the angular data from the sensor, and a number of parallel tracks are initialized for all possible objects types. The subset of possible object types can for example be identified by excluding highly unlike object types based on available sensor information, provided that the measurements contain discriminating features.

When the sensor 1 detects an object not previously tracked, the measurement is fed to an initialization unit 7. The initialization unit 7 initialized a new track by assigning values to a new state vector $X_0$, and a new covariance matrix $P_0$. If the incoming measurement is passive, i.e. it lacks range information, the range is set to a rough generic value. A suitable generic value for the range is the outer detection limit of the sensor. To indicate the large uncertainty of the range, the components of the corresponding covariance matrix $P_0$ is set very high. The initialized track $X_0$, $P_0$ is stored in a storage unit 9.

If it's possible to determine the type of the object based on the sensor data, information about the object type is sent to a tracking filter 11. The tracking filter 11 retrieves information about the object parameters and the assumed guidance law from the object library 3. Maneuvers of the object are predicted in the tracking filter 11 using the assumed guidance law derived from the estimated target type. The prediction is done using own ship kinematics, the assumed guidance law of the object and an existing or initialized object state vector, i.e. estimated kinematics.

A system according to the invention may comprise any kind of tracking filter that includes a predictive stage. The main task of the tracking filter 11 is to produce a state vector $X_t$. The state vector $X_t$ reflects the kinematic state of the object, and comprises information about the position and velocity of the object. More particularly, the state vector comprises information about the horizontal angle, the elevation angle, the radial distance, the horizontal angular velocity, the elevation angular velocity and the radial velocity. It is particular suitable to describe the state vector in a coordinate system denoted Modified Spherical Coordinates (MSC). The MSC coordinate system is often used in bearing tracking applications, since it de-couples the non-observable states range and range rate from the observable ones. An advantage with using the modified spherical coordinates is that the filter stability is improved over e.g. the Cartesian coordinates.

One commonly used tracking filter for state estimation is the so-called Kalman filter. The Kalman filter is described in more details in the book "Design and analysis of modern tracking systems" by S. Blackman, R. Popoli, Artech house 1999, ISBN 1-58053006-0 and in "A new approach to linear filtering and prediction problems", by R. E. Kalman, Transactions of the ASME, Journal of Basic Engineering 82, pp. 34-45, Mars 1960. A Kalman filter comprises the functionality to estimate an error component for the predicted state, i.e. to estimate the covariance matrix $P_t$ for the error of its own state estimate.

The covariance matrix can be seen as a quality measure of the state estimates. This is possible by introducing two important design parameters. One of those design parameters is the measurement noise matrix, which basically describes the variance of the measurement noise. It can be thought of as answering the question "how much do we believe in the measurements?". Normally, sensor statistical characteristics are well known, making it simple and straightforward to formulate the measurement noise. The other design parameter is the process noise matrix; describing the degree of reliability we assign the object dynamic model in the predictive state of the filtering.

In each update of the filter, the so-called Kalman gain is computed from the previous state and the covariance matrix, the measurement and process noise matrices and the transition function between the measurements and the state vector. This gain then becomes the weighting proportional between the predicted state and the new measurement. The next state is calculated by the Kalman filter by means of the following equation:

$$X(k+1) = \Phi x(k) + q(k) + f(k+1|k) \qquad (1)$$

X = the state vector of the object

Φ = the state transition matrix q = a zero-mean, white, Gaussian process with assumed known covariance f = an assumed known deterministic input such as own ship motions. According to the invention f depends on object accelerations and own ship accelerations.

Also it is assumed that the measurements y relates to the state X as:

$$y(k) = h(x(k)) + v(k) \qquad (2)$$

where v is zero-mean, white, Gaussian measurement noise with covariance R.

In the case with a missile moving toward an aircraft, the relation between the angular measurements and the state of the missile is non-linear. When dealing with non-linear relationships between measurements and states, an extended Kalman filter could be used. When an extended Kalman filter is used, the transition matrix must normally be recalculated in each update. The transition matrix is calculated as a Taylor series. The equations to be used for recalculating the transition matrix involves non-linear motion equations having predicted object accelerations, and own ship accelerations as variables. Thus, the object and own ship accelerations are direct inputs to the filter equations, and the predicted next state depends directly on the object and own ship accelerations.

The specific calculations involved in a bearing-only tracking filter using a MCS coordinate system is described in "Implementation of a angle-only tracking filter" SPIE Vol. 1481 Signal Processing of small targets 1991 by R. R. Allen and S. S. Blackman. The calculations are preferable done in a so-called RVH (Radial, Horizontal, Vertical) coordinate system. The RVH coordinate system is an ortho-normal Cartesian coordinate system with its origin in own ship, where the radial component is directed along the line of sight (LOS) from the object to own ship, the horizontal component is perpendicular to LOS and within the horizontal plane and the vertical component is perpendicular to LOS and within the vertical plane.

In order to predict the behavior of the object, own navigation data MT must be fed to the tracking filter 11, since this is done under the assumption that the object follows own ship. Normally, own navigation data comprises own position, own velocity and own acceleration vectors. The basic steps of the tracking filter 11 are: receiving measurements $M_t$ from the sensor, predicting the next kinematic state $X_{t+\Delta T}$ based on the received measurements $M_t$, own navigation data $M_O$ and a previously determined kinematic state $X_t$ of the object, and computing a new kinematic state $X_{t+\Delta T}$ and covariance matrix $P_{t+\Delta T}$ for the object based on the new measurement and the predicted state.

If a plurality of parallel tracks has been initialized, the system has to decide which of the parallel tracks to be kept and which to be rejected. This is done in a pruning unit 13. The pruning unit 13 is adapted to determine for each track if the object uses the assumed guidance law with a certain degree of reliability, and if the degree of reliability is lower than a predetermined limit to reject the track. For this purpose the covariance matrix P from the tracking filter is used. Thus, under way the set of tracks will dramatically decrease, as track prediction using incorrect object parameters will lead to indicative increases in the estimated error covariances.

The system also comprises an ID-unit 15, determining the type of the object by determining which of the parallel tracks does best suits the measurements from the sensor. In the library a plurality of object types are listed, and information is stored about which guidance law each object type uses. It is possible to decide which of the guidance laws the object follows by studying the covariance matrix of the tracks. When it is certain which guidance law the object follows it is also possible to determine the type of the object.

The system also comprises an approach-warning unit 17 arranged to determine whether the object uses the assumed guidance law with a certain degree of reliability, and to produce an approach warning if the assumed guidance law of the object follows own ship with a certain degree of reliability. The approach-warning unit 17 is adapted to determining whether the object uses the assumed guidance law with a certain degree of reliability based on the covariance matrix of the track.

Figure 2:
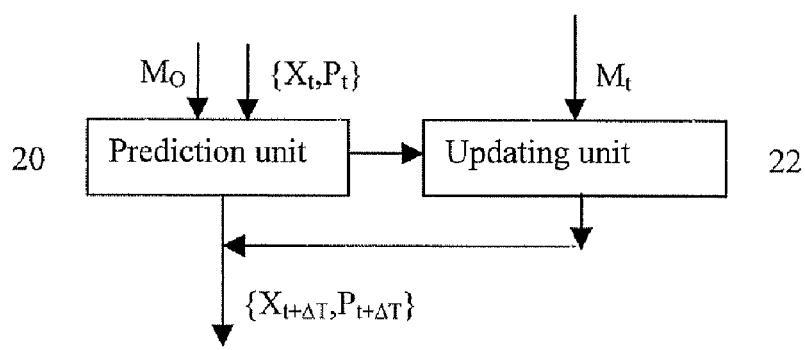
FIG. 2 shows a block diagram over the tracking filter.

FIG. 2 shows the tracking filter 11 in more detail. Own navigation data $M_O$ and a previously estimated track $X_t$, $P_t$ are fed to a prediction unit 20. The prediction unit 20 uses a kinematic model and process noise to predict the object kinematics. The kinematic model for example describes retardation due to drag and turn load. In case there is a new measurement $M_t$ from the sensor, the predicted state is fed to a measure update unit 22 of the tracking filter. The measure update unit 22 uses the new measurement and the measurement noise to calculate a new kinematic state $X_{t+\Delta T}$ and its covariance $P_{t+\Delta T}$ as a weighted summation of the new measurement and the predicted state.

According to the invention it is assumed that the object, for example a missile, is guided towards a target, in this case own aircraft, using a guidance law.

A guidance law is a mathematical model that describes the movements of the object, e.g. the turns of the object, based on the kinematics of the object and the kinematics of the target followed by the object. It is assumed that the guidance law is locked on a known position or on a target whose position and velocity is known, in this case on own ship. Note that it is easily detected if this assumption is valid, since incoming measurements not matching the predicted object kinematics will yield greatly increased uncertainties from the filter update.

Figure 3:
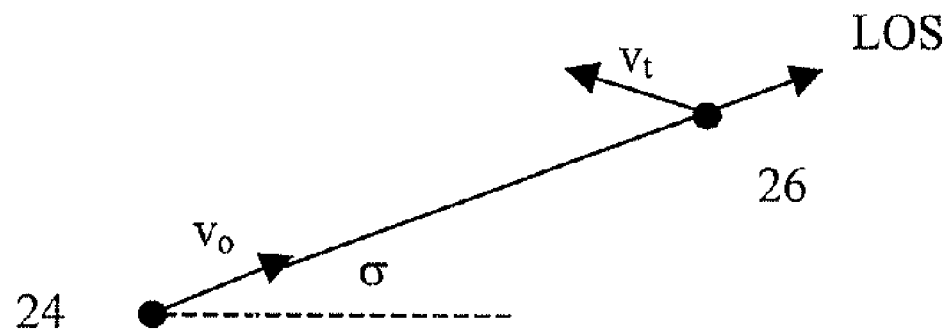
FIG. 3 illustrates an object following a pursuit guidance law locked on a moving target.

There are several known guidance laws. In the following two well-known guidance laws, denoted pursuit guidance law and proportional navigation (PN) will be described. FIG. 3 illustrates the pursuit guidance law. The pursuit guidance law assumes that the object 24 is navigating directly towards the current position of the target 26. The direction between the object and the target is denoted the line of sight direction (LOS) and the angle between the line of sight direction and the horizontal plane is denoted σ. The object 24 travels with a velocity $v_o$ towards the current target position. The target 26 travels with velocity $v_t$ in a direction different from the line of sight direction.

Figure 4:
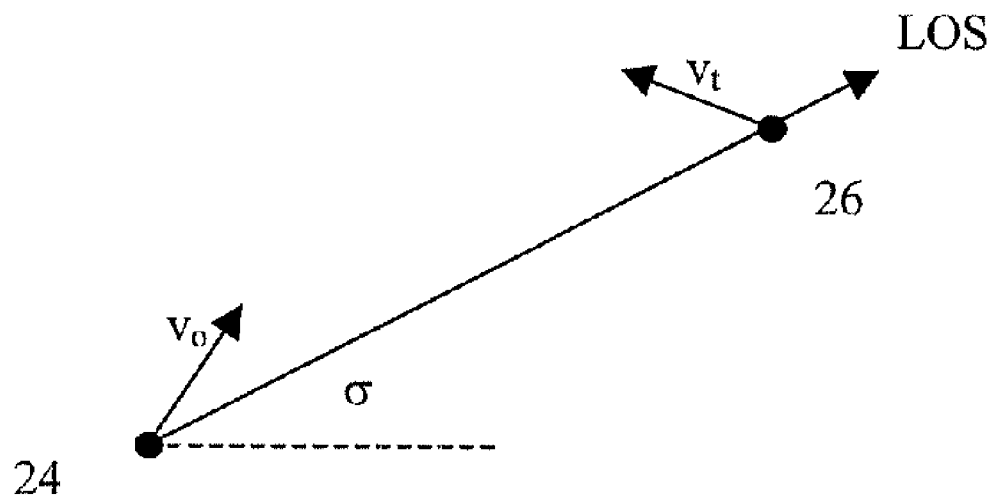
FIG. 4 illustrates an object following a proportional navigation guidance law locked on a moving target.

FIG. 4 illustrates the proportional navigation guidance law. Instead of navigating in the line of sight direction (LOS), the object 24 navigates towards a position ahead of the target 26. Proportional navigation uses the line of sight rate amplified with a so-called navigation constant C and a closing velocity as a commanded lateral acceleration. This gives a predicted behavior of the object, and it moves along an intercept trajectory against the target. The lateral acceleration for an object guided by a proportional navigation is defined as:

$$a_o = C \dot{\sigma} v_c \quad (3)$$

C=a constant between 3-4.5

$v_c$=the closing velocity between the object and the target.

$\dot{\sigma}$=the line of sight rate.

To predict the next state of the object, the lateral acceleration $a_o$ of the object has to be predicted. The kinematic model of the object comprises an assumption that the object follows a guidance law, and is used to predict the acceleration of the object. The kinematic model describes the physical dynamics of the object and comprises two parts, one part describing the contribution to the acceleration due to air resistance and gravity, and the other part describing the contribution to the acceleration due to the guidance law. Input to the kinematic model is estimated kinematics of the object, object parameters, such as weight, air resistance and drag resistance, the guidance law, and own ship kinematics, such as position, velocity, and accelerations. Output from the kinematic model is a predicted object acceleration vector.

Figure 5:
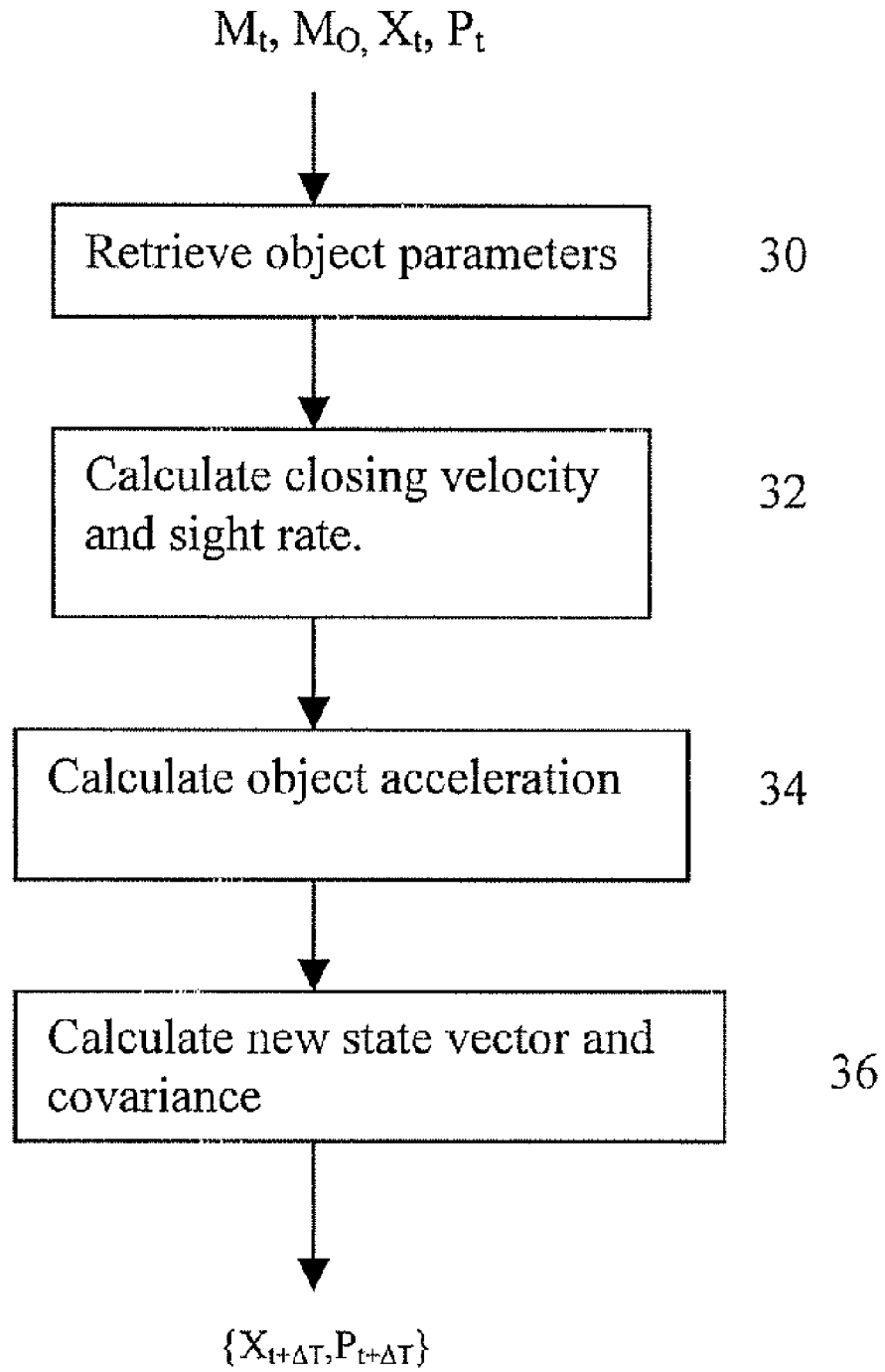
FIG. 5 illustrates, by means of a flow diagram, prediction of the next state.

When predicting the next state, the tracking filter considers the acceleration of the object. The predicted state is calculated based on an estimated acceleration of the object. The acceleration is estimated based on an assumed guidance law, object parameters, estimated object kinematics and target kinematics from own navigation data. FIG. 5 illustrates by means of a flow diagram the calculation of the new predicted acceleration of the object, and a new state vector, when it is assumed that the object uses the proportional navigation law. Object parameters and a guidance law is retrieved from the object library, block 30. In this embodiment example the object is assumed to follow the Proportional Navigation law. A closing velocity $v_c$ is calculated based on the velocity of the target, derived from own navigation data $M_O$, and the velocity of the object calculated in a previous filtering step, derived from the previous state $X_t$, block 32. The line of sight rate $\dot{\sigma}$ is calculated based on kinematics of the target, derived from own navigation data $M_O$, and kinematics of the object derived from the previous state $X_t$, block 32.

The commanded acceleration of the object is calculated based on the calculated closing velocity and line of sight rate. The commanded acceleration of the object depends on what kind of guidance law the object follows. For example if the object is assumed to follow the proportional navigation guidance law, the commanded acceleration is calculated according to equation 3. A new predicted velocity of the object is calculated based on the previously estimated object velocity, object air resistance and drag resistance. A new predicted acceleration of the object is calculated by means of the kinematic model. The new predicted acceleration of the object is calculated based on the previously estimated object velocity, the new calculated object velocity and the sample time ΔT in the system, block 34. A new state vector $X_{t+\Delta T}$ is calculated based on the new predicted velocity, by means of equation 1, and a new covariance matrix $P_{t+\Delta T}$ is calculated, block 36.

Figure 6:
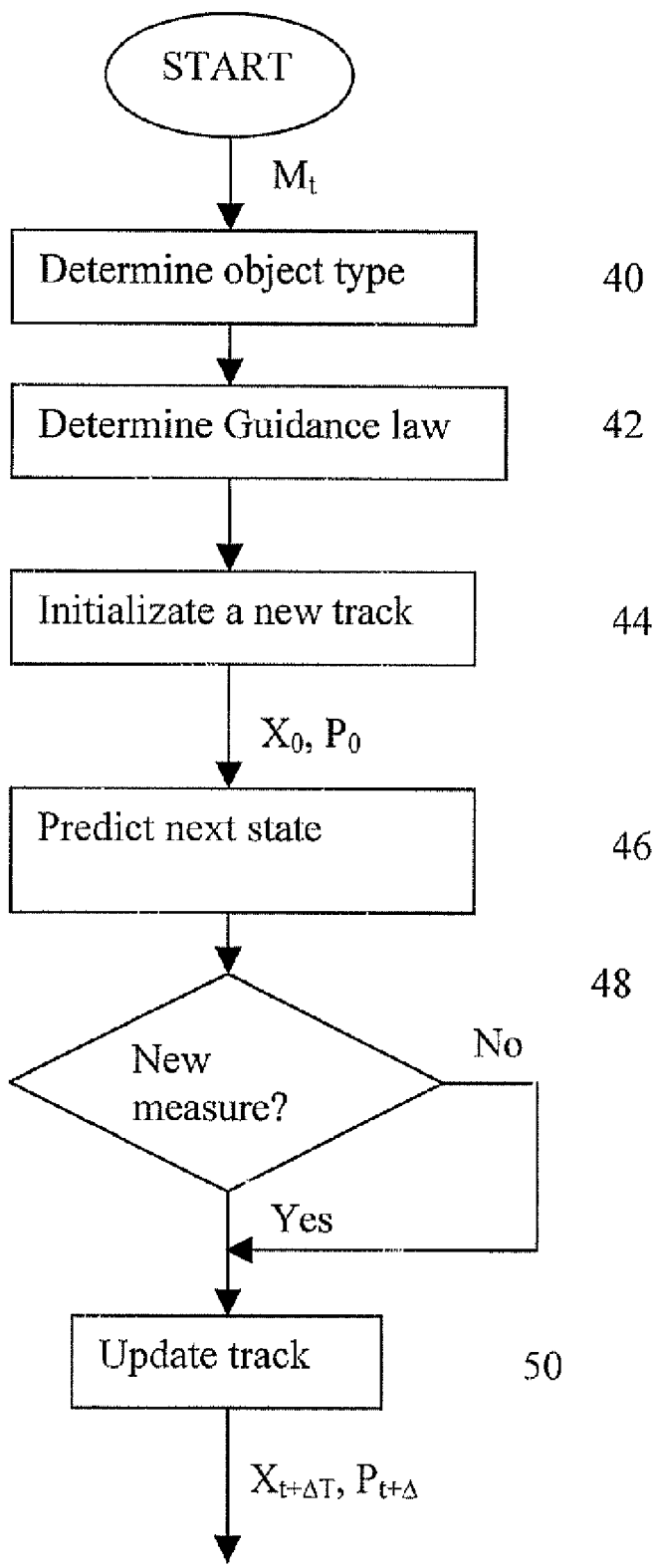
FIG. 6 illustrates, by means of a flow diagram, a method for determination of kinematics of a moving object according to an embodiment of the invention.

FIG. 6 illustrates by means of a flow diagram, an embodiment of the method according to the invention and it will be understood that each block of the flow chart can be implemented by computer program instructions suitable for being executed on a processor unit. The starting point is that own ship has no indication of a missile being fired at it, and therefore no track has been initialized. When the sensor detects a moving object, for example a missile launch, or an approaching missile, a position measurement $M_t$ containing bearing and elevation is sent to the tracking system. If possible identifying features are present, these are also passed along with the measurement. The system receives the measurement $M_t$ and the identifying features from the sensor.

When the sensor detects an object not previously tracked, a object type is determined based on the received measurements, block 40. If it is possible to determine the object type, an assumed guidance law and object parameters are retrieved from the object library, block 42. Otherwise, the object is assigned a generic guidance law, and the object parameters are assigned generic values. The information about the guidance law and object parameters is passed to the filtering unit. The measurement $M_t$ is fed to the initialization unit, which determines an initial kinematic state vector $X_0$ comprising the estimated position and velocity of the object, and a corresponding state estimation error covariance matrix $P_0$, block 44. The state vector $X_0$ and the covariance matrix $P_0$ form the new track. Thus, a new track is initialized and the new state vector and its covariance matrix are stored in the storage unit.

Thereafter the track is repeatedly updated. The tracking update takes place in the tracking filter. A new predicted kinematics state is determined, based on the object parameters, the assumed guidance law, and the previously determined kinematic state, block 46. If there is a new measurement $M_t$ from the sensor, block 48, the track is updated by calculating a new kinematic state $X_{t+\Delta T}$ and its covariance matrix $P_{t+\Delta T}$ as a weighted summation of the new measurement and the predicted state, block 50. If there is no new measurement, the updated state is set as the new predicted state. The updated track is fed back to the storage unit. This update is repeated, unless the track is cancelled. The cancelling of a track can for example be done by thresholding the uncertainties calculated in the covariance matrix. When the uncertainty for the range grows absurdly large, it is assumed that the initial assumption that the detected object was following own ship was incorrect.

Figure 7:
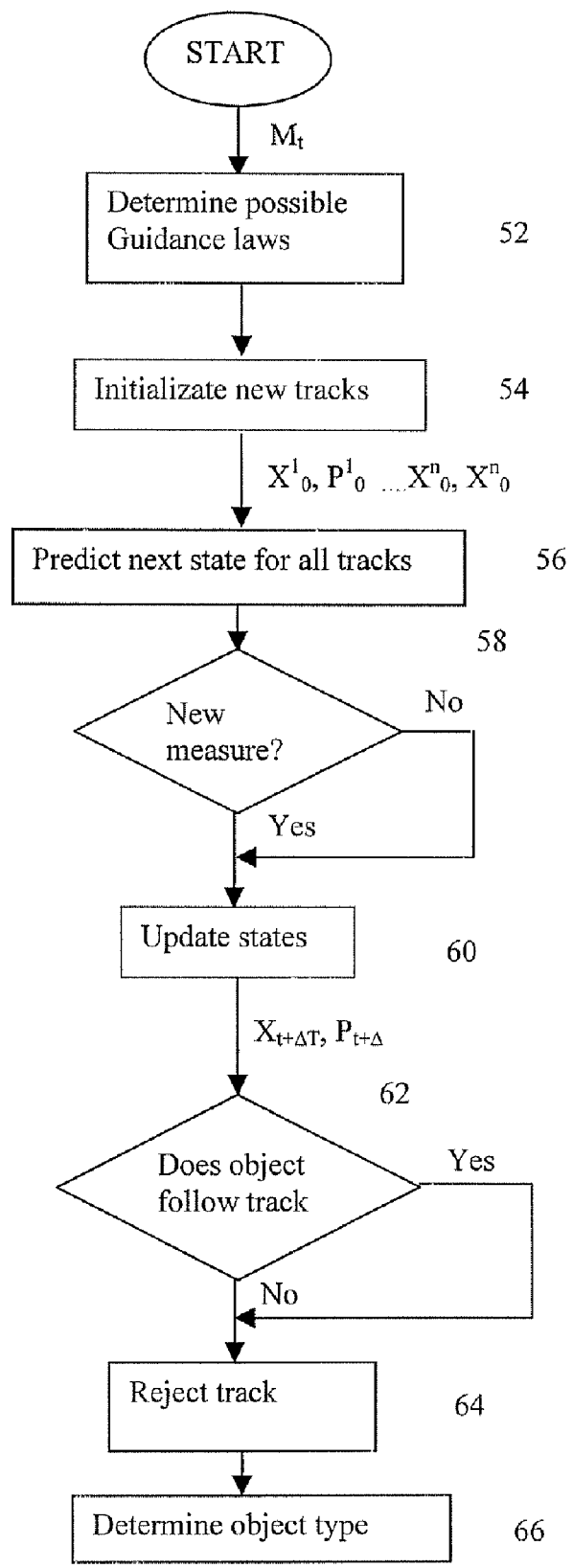
FIG. 7 illustrates, by means of a flow diagram, a method for determination of kinematics of a moving object according to another embodiment of the invention.

FIG. 7 illustrates by means of a flow diagram, another embodiment of the method according to the invention. Angular measurements $M_t$ from the sensor are received, and considering the measurements one or more likely object types are determined. Each object type is associated a guidance law and a plurality of object parameters. Thus, one or more possible guidance laws are determined based on the received measurements, block 52. For each of the determined guidance laws, a new track $X^1_0, P^1_0 \ldots X^n_0, P^n_0$ is calculated, block 54. The tracking filter repeatedly determines new predicted kinematics states for the parallel tracks, block 56. If there is a new measurement from the sensor, block 58, the track is updated by calculating a new kinematic state $X_{t+\Delta T}$ and its covariance $P_{t+\Delta T}$ as a weighted summation of the new measurement and the predicted state, block 60. If there is no new measurement, the predicted state is set as the new filtered state.

By continuously considering the error covariance matrix for each track, it is possible to determine whether the object follows the track or not. If the covariance matrix increases significantly the track is rejected, block 64. If the covariance matrix remains low or even decreases, it is likely that the object follows the track, i.e. the object uses the assumed guidance law and follows own ship. For the case with a missile following an aircraft and a passive sensor is used, it is suitable to use the covariance for the non-observable states such as distance and closing velocity to decide whether the object follows the track or not. When it has been established that the object follows a track with a certain degree of reliability, the object type is determined based on the guidance law and parameters used for the track, block 66. If the assumption that the object follows own ship seems to be correct, an approach warning is generated.

The present invention is not limited to the embodiments disclosed but may be varied and modified within the scope of the following claims.

What is claimed is:

1. A method for determination of kinematics of a moving object, the method comprising:
   receiving angular data for the moving object at a plurality of observation times;
   determining a first kinematic state of the moving object based on the angular data at a first observation time;
   determining a predicted kinematic state of the moving object based on a kinematic model of the moving object and at least one previously determined kinematic state of the moving object;
   determining a subsequent kinematic state of the moving object at a subsequent observation time based on the predicted kinematic state of the moving object and the angular data for the moving object, wherein the kinematic model comprises an assumption that the moving object follows a guidance law navigating the moving object to a known position;
   determining whether the moving object is moving toward the known position; and
   generating a warning that the moving object is moving toward the known position if it is determined that the moving object is moving toward the known position.

2. The method according to claim 1, wherein the known position is on a moving target, the method further comprising:
   receiving kinematic data for the moving target; and
   determining the predicted kinematic state of the moving object based on the received kinematic data for the moving target.

3. The method according to claim 2, further comprising:
   receiving navigation data for the moving target; and
   determining the predicted kinematics state of the moving object based on the moving target navigation data.

4. The method according to claim 3, wherein the moving target navigation data comprises a position of the moving target, a velocity of the moving target and an acceleration of the moving target.

5. The method according to claim 1, wherein the guidance law is locked on a moving target, the method further comprising:
   receiving kinematic data for the moving target; and
   determining the predicted kinematic state of the moving object based on the received kinematic data for the moving target.

6. The method according to claim 1, further comprising:
   storing more than one guidance law;
   assuming that the moving object uses one of the stored guidance laws;
   determining an assumed guidance law based on the stored guidance laws and the received angular data; and
   determining the subsequent predicted kinematics state of the moving object based on the assumed guidance law.

7. The method according to claim 6, further comprising:
   storing a plurality of object types;
   associating each object type with one of the stored guidance laws;
   determining an object type of the moving object from the plurality of object types based on said received angular data; and
   determining the assumed guidance law in dependence of the determined type of the moving object.

8. The method according to claim 6, further comprising:
   determining more than one predicted kinematics state of the moving object, each predicted state being determined based on one of the stored guidance laws;
   estimating an error component for the predicted kinematic states based on the received angular data; and
   determining the assumed guidance law based on the estimated error components.

9. The method according to claim 8, wherein the error component comprises an error covariance matrix for the predicted kinematic state.

10. The method according to claim 8, further comprising:
    storing information about a plurality of object types and which guidance law a specific object type preferably uses; and
    identifying the object type of the moving object based on the stored information and the assumed guidance law.

11. The method according to claim 6, further comprising:
    determining whether the moving object uses the assumed guidance law with a certain degree of reliability; and
    producing an approach warning if the assumed guidance law of the moving object follows the known position with a certain degree of reliability.

12. The method according to claim 11, further comprising:
    estimating an error component for the predicted kinematic state based on the received angular data; and
    determining whether the moving object uses the assumed guidance law with a certain degree of reliability based on the estimated error component.

13. The method according to claim 1, wherein the determination of predicted kinematic state of the moving object comprises determining a position of the moving object relative to the known position, and determining a closing velocity of the moving object, and wherein the predicted kinematic state comprises information about position and velocity of the moving object.

14. The method according to claim 1, wherein said angular data comprises at least a horizontal bearing.

15. The method according to claim 1, further comprising:
    calculating an acceleration of the moving object based on the kinematic model; and
    determining the predicted kinematic state of the moving object based on the calculated acceleration.

16. A computer program product, comprising:
    a computer readable medium; and computer program instructions recorded on the computer readable medium and executable by a processor for carrying out a method comprising receiving angular data for the moving object at a plurality of observation times;

determining a first kinematic state of the moving object based on the angular data at a first observation time;

determining a predicted kinematic state of the moving object based on a kinematic model of the moving object and at least one previously determined kinematic state of the moving object;

determining a subsequent kinematic state of the moving object at a subsequent observation time based on the predicted kinematic state of the moving object and the angular data for the moving object, wherein the kinematic model comprises an assumption that the moving object follows a guidance law navigating the moving object to a known position;

determining whether the moving object is moving toward the known position; and generating a warning that the moving object is moving toward the known position if it is determined that the moving object is moving toward the known position.

17. A system for determining kinematics of a moving object, the system comprising:

a sensor configured to produce angular data for the moving object at a plurality of observation times;

a state initialization unit configured to receive the angular data from the sensor and on basis thereof determining a first kinematic state of the moving object; and a tracking filter comprising a prediction unit and configured to determine a predicted kinematic state of the moving object based on a kinematic model of the moving object and at least one previously determined kinematic state of the moving object, and comprising a state updating unit configured to receive angular data from the sensor and the predicted kinematic state of the object, and on a basis thereof determining an updated kinematic state of the object, wherein the kinematic model comprises a guidance law navigating the moving object to a known position.

18. The system according to claim 17, wherein the guidance law assumes that the moving object follows a moving target and the prediction unit is configured to receive kinematic data for the moving target and on a basis thereof determine the predicted kinematic state of the moving object.

19. The system according to claim 18, wherein the prediction unit is configured to receive navigation data from the moving target and on a basis thereof determine the predicted kinematic state of the moving object.

20. The system according to claim 17, further comprising:

a library configured to store a plurality of guidance laws; and a guidance law selecting unit configured to determine an assumed guidance law based on the stored guidance laws and the received angular data, wherein the prediction unit configured to determine the predicted kinematic state of the moving object based on the assumed guidance law.

21. The system according to claim 20, wherein the library is configured to store a plurality of object types, each object type being associated with one of the stored guidance laws, and wherein the guidance law selecting unit is configured to receive the angular data and on a basis thereof determine the type of object, and to determine the assumed guidance law depending on the determined type of the moving object.

22. The system according to claim 20, wherein said tracking filter is configured to determine more than one predicted kinematic state of the moving object based on the stored guidance laws, and to estimate an error component for the predicted kinematic states based on the angular data, and wherein the system is configured to determine the assumed guidance law based on the estimated error components.

23. The system according to claim 22, wherein the error component comprises an error covariance matrix for the predicted kinematic state.

24. The system according to claim 22, wherein the library is configured to store information about a plurality of object types and which guidance law a specific object type preferably uses, the system further comprising:

an identification module arranged to identify the type of object based on the stored information and the assumed guidance law.

25. The system according to claim 20, further comprising:

an approach-warning unit configured to determine whether the moving object uses the assumed guidance law with a certain degree of reliability, and to produce an approach warning if the assumed guidance law of the object follows the known position with a certain degree of reliability.

26. The system according to claim 25, wherein the tracking filter is configured to receive the angular data and on a basis thereof estimate an error component for the predicted kinematic state, and wherein the approach-warning unit is configured to determine whether the moving object uses the assumed guidance law with a certain degree of reliability based on the estimated error component.

27. The system according to claim 17, wherein the determination of kinematics of the moving object comprises determining a position of the moving object relative to the known position, and determining a closing velocity of the moving object, and wherein the kinematic state comprises information about the position and velocity of the moving object.

28. A system according to claim 17, wherein the angular data comprises a horizontal bearing.

29. The system according to claim 17, wherein the prediction unit is configured to calculate an acceleration of the moving object based on the kinematic model, and to determine the predicted kinematic state of the moving object based on the calculated acceleration.

30. A system for determining kinematics of a moving object in an aircraft for passive determination of the kinematics of a missile, the system comprising:

a sensor configured to produce angular data for the object at a number of observation times;

a state initialization unit configured to receive angular data from the sensor and on a basis thereof determine a first kinematic state of the moving object; and a tracking filter comprising a prediction unit and configured to determine a predicted kinematic state of the moving object based on a kinematic model of the moving object and at least one previously determined kinematic state of the moving object, and comprising a state updating unit configured to receive angular data from the sensor and the predicted kinematic state of the object, and on a basis thereof determining an updated kinematic state of the object, wherein the kinematic model comprises a guidance law navigating the moving object to a known position.

* * * * *